(12) United States Patent
Wang et al.

(10) Patent No.: US 10,333,839 B2
(45) Date of Patent: Jun. 25, 2019

(54) ROUTING A DATA PACKET IN A COMMUNICATION NETWORK

(71) Applicant: Raytheon Company, Waltham, MA (US)

(72) Inventors: Mu-Cheng Wang, Acton, MA (US); Steven A. Davidson, Acton, MA (US); Yi-Chao S. Chuang, Acton, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/827,029

(22) Filed: Mar. 14, 2013

(65) Prior Publication Data

US 2013/0250955 A1 Sep. 26, 2013

Related U.S. Application Data

(60) Provisional application No. 61/613,131, filed on Mar. 20, 2012.

(51) Int. Cl.
*H04L 12/741* (2013.01)
*H04L 12/721* (2013.01)

(52) U.S. Cl.
CPC .............. *H04L 45/74* (2013.01); *H04L 45/12* (2013.01); *H04L 45/54* (2013.01)

(58) Field of Classification Search
CPC ......... H04L 45/04; H04L 45/12; H04L 45/42; H04L 45/121; H04L 45/54; H04L 45/74
USPC .............. 370/315, 395.21, 395.53, 397, 401; 709/238, 239
See application file for complete search history.

(56) References Cited

U.S. PATENT DOCUMENTS

| | | | | |
|---|---|---|---|---|
| 5,381,404 | A | * | 1/1995 | Sugano ............... H04L 41/5022 370/238 |
| 5,579,307 | A | * | 11/1996 | Richetta et al. .............. 370/409 |
| 5,754,543 | A | * | 5/1998 | Seid .............................. 370/351 |
| 5,933,425 | A | | 8/1999 | Iwata |
| 6,327,254 | B1 | | 12/2001 | Chuah |
| 6,477,172 | B1 | | 11/2002 | Burger et al. |
| 6,535,482 | B1 | | 3/2003 | Hadi Salim et al. |

(Continued)

FOREIGN PATENT DOCUMENTS

| | | |
|---|---|---|
| DE | 102 32 945 | 1/2004 |
| DE | 102 32 945 A1 | 1/2004 |

(Continued)

OTHER PUBLICATIONS

J. Sun, M. Wang, et al., "Dynamic Routing with Link State Information in ADNS and Future SATCOM Network," Proceedings of 2009 IEEE Military Communications Conference, Oct. 2009.

(Continued)

*Primary Examiner* — Michael Thier
*Assistant Examiner* — Prince A Mensah
(74) *Attorney, Agent, or Firm* — Daly, Crowley, Mofford & Durkee, LLP (57) ABSTRACT

In one aspect, a method includes receiving a data packet at a routing node that includes a processor. The method also includes determining at least one value for the data packet, selecting a routing table from a plurality of routing tables stored at the routing node in response to the at least one value for the packet and forwarding the data packet in response to the routing table selected. Each routing table is associated with a respective one cost function.

20 Claims, 4 Drawing Sheets

(56) References Cited

U.S. PATENT DOCUMENTS

| | | | |
|---|---|---|---|
| 6,538,777 B1* | 3/2003 | Barry | H04J 14/0227 |
| | | | 370/370 |
| 6,977,931 B1* | 12/2005 | Hadziomerovic | H04L 45/02 |
| | | | 370/238 |
| 6,981,055 B1* | 12/2005 | Ahuja et al. | 709/238 |
| 8,059,620 B2 | 11/2011 | Moon | |
| 2002/0097680 A1* | 7/2002 | Liu | H04Q 3/0079 |
| | | | 370/238 |
| 2002/0129086 A1* | 9/2002 | Garcia-Luna-Aceves et al. | |
| | | | 709/200 |
| 2004/0103205 A1* | 5/2004 | Larson et al. | 709/229 |
| 2004/0117474 A1 | 6/2004 | Ginkel et al. | |
| 2004/0165597 A1* | 8/2004 | Bicknell | H04L 45/04 |
| | | | 370/395.31 |
| 2005/0259610 A1 | 11/2005 | Demers et al. | |
| 2007/0064697 A1* | 3/2007 | Nesbitt et al. | 370/392 |
| 2007/0104215 A1 | 5/2007 | Wang et al. | |
| 2007/0153808 A1* | 7/2007 | Parker et al. | 370/395.53 |
| 2007/0211731 A1* | 9/2007 | Balandin et al. | 370/397 |
| 2008/0025270 A1 | 1/2008 | Moon | |
| 2009/0138588 A1 | 5/2009 | Qian et al. | |
| 2009/0141656 A1* | 6/2009 | Fan | H04L 29/12009 |
| | | | 370/254 |
| 2009/0190477 A1* | 7/2009 | Osborne | H04L 45/50 |
| | | | 370/237 |
| 2009/0228953 A1 | 9/2009 | Hu et al. | |
| 2009/0323700 A1 | 12/2009 | Schwan et al. | |
| 2010/0061231 A1* | 3/2010 | Harmatos | H04L 45/02 |
| | | | 370/228 |
| 2010/0246587 A1* | 9/2010 | Schutz | H04L 45/00 |
| | | | 370/401 |
| 2011/0063977 A1 | 3/2011 | Halfmann et al. | |
| 2012/0134264 A1* | 5/2012 | Ludwig et al. | 370/230 |
| 2013/0088970 A1 | 4/2013 | Wang et al. | |
| 2013/0127633 A1 | 5/2013 | Hershey et al. | |
| 2013/0286957 A1 | 10/2013 | Bucknell et al. | |
| 2014/0112275 A1* | 4/2014 | Deb | H04W 16/14 |
| | | | 370/329 |
| 2014/0279809 A1 | 9/2014 | Hershey et al. | |

FOREIGN PATENT DOCUMENTS

| | | |
|---|---|---|
| EP | 0 891 107 | 1/1999 |
| EP | 1 278 348 A1 | 1/2003 |
| EP | 2 096 804 A1 | 9/2009 |
| JP | 2003-046548 A | 2/2003 |
| JP | 2003-244223 | 8/2003 |
| JP | 2003-338835 A | 11/2003 |
| JP | 2005-079025 A | 3/2005 |
| JP | 2007-336600 A | 12/2007 |
| JP | 2008-135914 A | 6/2008 |
| JP | 2011-525767 A | 9/2011 |
| JP | 2015-501788 A | 1/2015 |
| WO | WO 2005/079025 | 8/2005 |
| WO | WO 2010/063306 | 6/2010 |
| WO | WO 2013/052306 A1 | 4/2013 |

OTHER PUBLICATIONS

B. Barry, S. Ratliff, et al., "RFC 5578—PPP Over Ethernet (PPPoE) Extensions for Credit Flow and Link Metrics," Network Working Group, Feb. 2010.

M. Wang, S. Davidson, and S. Mohan, "Design Consideration of Router-to-Radio Interface in Mobile Networks," Proceedings of 2011 IEEE Military Communications Conference, Nov. 2011.

Percy, A., "Understand Latency in IP Telephony," Telephony World, http://www.telephonyworld.com/training/brooktrout/iptel_latency_wp.html.

"Implementing EIGRP on Cisco IOS XR Software," Cisco document, http://www.cisco.com/en/US/docs/ios_xr_sw/iosxr_r3.7/routing/configuration/guide/rc37egp.pdf.

P. Psenak, S. Mirtorabi, et al., "RFC 4915—Multi-Topology Routing in OSPF", Network working Group, Feb. 2007.

"Multi-Topology Routing", Cisco document, http://www.cisco.com/en/US/docs/ios/mtr/configuration/guide/multi-top_rtng.pdf.

PCT International Preliminary Report on Patentability and Written Opinion dated Oct. 2, 2014; For PCT Pat. App. No. PCT/US2013/031714; 8 Pages.

Japanese Patent Application No. 2014-534595 Office Action dated May 11, 2015, including English translation, 8 pages.

Response to European Office Action dated Nov. 25, 2014 corresponding to European Patent Application No. 13714112.3; Response filed on Jun. 4, 2015; 5 Pages.

Verma et al., "Precedence Based Preemption and Bandwidth Reservation Scheme;" International Journal of Computer Science Issues, vol. 9, Issue 6, No. 2; Nov. 2012; 6 Pages.

Jawhar et al., "A Dynamic Range Resource Reservation Protocol for QoS Support in Wireless Networks;" The $3^{rd}$ ACS/IEEE International Conference on Computer Systems and Applications; 2005; 8 Pages.

Sharma et al., "Agent Based Bandwidth Reservation Routing Technique in Mobile Ad Hoc Networks;" International Journal of Advanced Computer Science and Applications, vol. 2, No. 12; 2011; 6 Pages.

Elston et al., "Networked UAV Command, Control and Communication;" AIAA Guidance, Navigation, and Control Conference; Aug. 21-24, 2006; 9 Pages.

Wang et al., "A Design Method to Select Optimal Routes and Balance Load in Wireless Communication Networks;" MILCOM; 2013.

JBoss Drools Team, "Drools Documentation" (Part 1 of 3); Version 6.0.1 Final; http://www.drools.org/; 220 Pages.

JBoss Drools Team, "Drools Documentation" (Part 2 of 3); Version 6.0.1 Final; http://www.drools.org/; 220 Pages.

JBoss Drools Team, "Drools Documentation" (Part 3 of 3); Version 6.0.1 Final; http://www.drools.org/; 204 Pages.

Berry et al., "PPP Over Ethernet (PPPoE) Extensions for Credit Flow and Link Metrics;" RFC Archive 5578; Feb. 2010; 24 Pages.

Mamakos et al., "A Method for Transmitting PPP Over Ethernet (PPPoE);" RFC Archive 2516; Feb. 1999; 16 Pages.

Simpson, "The Point-to-Point Protocol (PPP);" RFC Archive 1661; Jul. 1994; 48 Pages.

Berry et al., "PPP Over Ethernet (PPPoE) Extensions for Credit Flow and Link Metrics;" RFC Archive 4938; Jun. 2007; 16 Pages.

Wang et al., "Methods and Apparatus for Router-To-Radio Flow Control;" Corresponding to U.S. Appl. No. 13/269,100, filed Oct. 7, 2011; 22 Pages.

Office Action dated Jun. 20, 2013 corresponding to U.S. Appl. No. 13/269,100; 19 Pages.

Response to Office Action dated Jun. 20, 2013 corresponding to U.S. Appl. No. 13/269,100; Response filed Sep. 16, 2013; 10 Pages.

Final Office Action dated Dec. 5, 2013 corresponding to U.S. Appl. No. 13/269,100; 17 Pages.

Wang et al., "Guidelines for Sizing Traffic Queues in Terminals of Future Protected Satcom Systems;" Proceedings from the Military Communications Conference; 2009; 9 Pages.

Dye et al., "Network Fundamentals;" CCNA Exploration Companion Guide; Published by Cisco Press in Mar. 2009; 75 Pages.

Appeal Brief in Response to Office Action dated Dec. 5, 2013 corresponding to U.S. Appl. No. 13/269,100; Response filed Jun. 26, 2014; 15 Pages.

Examiner's Answer to Appeal Brief dated Aug. 12, 2014 corresponding to U.S. Appl. No. 13/269,100; 23 Pages.

Reply Brief in Response to Examiner's Answer dated Aug. 12, 2014 corresponding to U.S. Appl. No. 13/269,100; Reply filed Oct. 14, 2014; 10 Pages.

PCT Notification of Transmittal of the ISR and Written Opinion dated Jan. 18, 2013 corresponding to Appl. No. PCT/US2012/057004; 1 Page.

PCT International Search Report dated Jan. 18, 2013 corresponding to Appl. No. PCT/US2012/057004; 4 Pages.

PCT Written Opinion of the ISA dated Jan. 18, 2013 corresponding to Appl. No. PCT/US2012/057004; 9 Pages.

(56) References Cited

OTHER PUBLICATIONS

Lekcharoen et al., "An Adaptive Fuzzy Control Traffic Shaping Scheme Over Wireless Networks;" Proceedings of the Asia-Pacific Conference on Communications; Oct. 1, 2007; 6 Pages.
PCT Notification of Transmittal of IPR dated Apr. 17, 2014 corresponding to Appl. No. PCT/US2012/057004; 1 Page.
PCT International Preliminary Report dated Apr. 17, 2014 corresponding to Appl. No. PCT/US2012/057004; 1 Page.
PCT Written Opinion of the ISA dated Apr. 17, 2014 corresponding to Appl. No. PCT/US2012/057004; 7 Pages.
Singapore Search Report and Written Opinion dated Nov. 4, 2014 corresponding to Appl. No. 11201401150V; 11 Pages.
European Communication Persuant to Rules 161(1) and 162 EPC dated Jun. 6, 2014 corresponding to Appl. No. 12780938.2; 2 Pages.
Response to European Communication Persuant to Rules 161(1) and 162 EPC dated Jun. 6, 2014 corresponding to Appl. No. 12780938.2; Response filed on Dec. 16, 2014; 13 Pages.
European Communication Persuant to Rules 161(1) and 162 EPC dated Nov. 25, 2014 corresponding to Appl. No. 13714112.3; 2 Pages.
Hershey et al., "Data Broker Reasoner;" Corresponding to U.S. Appl. No. 14/109,059, filed Dec. 17, 2013; 24 Pages.
Hershey et al., "Procedure for Detection of and Response to Distributed Denial of Service Attacks on Complex Enterprise Systems;" Proceedings of the 2012 IEEE Systems Conference; Mar. 20, 2012; 6 Pages.
Hershey et al., "Monitoring and Response for Real-Time Voice Messages Transmitted Using Wi-Fi Within Net-Centric Enterprise Systems;" Proceedings of MILCOM 2010; Nov. 3, 2010; 6 Pages.
Hershey et al., "Real-time Communications Resource Allocation Process, Architecture, and Algorithm;" Proceedings of MILCOM 2013; Nov. 19, 2013; 6 Pages.
Hershey et al., "End-to-End Applications and Algorithm Integration (E2A2I) Method and Architecture;" Proceedings of MILCOM 2013; 6 Pages.
Hershey et al., "System of Systems for Autonomous Mission Decisions;" Proceedings of the 2013 IEEE International Systems to Systems Engineering Conference; Jun. 5, 2013; 6 Pages.
Hershey et al., "Composable, Distributed System to Derive Actionable Mission Information from Intelligence, Surveillance, and Reconnaissance (ISR) Data;" Proceedings of the 2013 IEEE Systems Conference; Apr. 17, 2013; 8 Pages.
Hershey, "Automated Data Reduction Method for Intelligence, Surveillance, and Reconnaissance Systems;" Proceedings of the Royal Canadian Air Force Avionics and Systems Workshop; Dec. 2012; 13 Pages.
Hershey et al., "A Policy-Based Approach to Automated Data Reduction for Intelligence, Surveillance, and Reconnaissance Systems;" Proceedings of MILCOM 2012; Oct. 29, 2012; 6 Pages.
Hershey et al., "Context Switching System and Architecture for Intelligence, Surveillance, and Reconnaissance;" Proceedings of SPIE, vol. 8360, 83600E-1-83600E-8; Apr. 2012; 8 Pages.
Uszok et al., "KAoS Policy and Domain Services: Toward a Description-Logic Approach to Policy Representation, Deconfliction, and Enforcement;" Proceedings of the IEEE 4$^{th}$ International Workshop on Policies for Distributed Systems and Networks; Jan. 2003; 12 Pages.
Bunch et al., "Regulating the Exchange of Tactical Military Information Using the KAoS Policy Services Framework;" Army Research Laboratory: Advanced Decision Architectures for the Warfighter; Jan. 2009; 21 Pages.
Suri et al., "DAML-Based Policy Enforcement for Semantic Data Transformation and Filtering in Multi-Agent Systems;" Proceedings of the 2$^{nd}$ International Joint Conference on Autonomous Agents and Multiagent Systems (AAMS); Jan. 2003; 8 Pages.
Pham et al., "Intelligence, Surveillance, and Reconnaissance Fusion for Coalition Operations;" Proceedings of the 11$^{th}$ International Conference on IEEE; Jun. 30, 2008; 8 Pages.

PCT Notification of Transmittal of the ISR and Written Opinion dated Oct. 22, 2014 corresponding to Appl. No. PCT/US2014/011599; 1 Page.
PCT International Search Report dated Oct. 22, 2014 corresponding to Appl. No. PCT/US2014/011599; 4 Pages.
PCT Written Opinion of the ISA dated Oct. 22, 2014 corresponding to Appl. No. PCT/US2014/011599; 9 Pages.
Wang et al., "Resource Allocating in a Network;" Corresponding to U.S. Appl. No. 14/529,850, filed Oct. 31, 2014; 21 Pages.
PAIR Image File Wrapper (Part 2 of 2) downloaded on Jan. 16, 2015 corresponding to U.S. Appl. No. 13/269,100; 256 Pages.
PAIR Image File Wrapper downloaded on Jan. 16, 2015 corresponding to U.S. Appl. No. 14/109,059; 367 Pages.
PAIR Image File Wrapper downloaded on Jan. 20, 2015 corresponding to U.S. Appl. No. 14/529,850; 86 Pages.
Australian Examination Report No. 1 dated Mar. 17, 2015 corresponding to Australian Patent Appl. No. 2013235426; 3 Pages.
Japanese Office Action (with English Translation) dated Sep. 25, 2015 for Japanese Application No. 2015-501788; 7 Pages.
Hida et al., "Implementation and Performance Evaluation of Traffic Engineering Scheme Based on Multiple Routing Tables;" Partial Translation; Technical Report of The Institute of Electronics, Information and Communication (IEICE), vol. 103, No. 692; Feb. 27, 2004; 12 Pages.
Response to Australian Examination Report dated Mar. 17, 2015 corresponding to Australian Patent Application No. 2013235426; Response filed on Oct. 28, 2015; 23 Pages.
PCT International Preliminary Report and Written Opinion dated Sep. 24, 2015 corresponding to International Application No. PCT/US2014/011599; 10 Pages.
Office Action dated Sep. 14, 2015 corresponding to U.S. Appl. No. 14/109,059; 40 Pages.
Adams, "The Predictive Battlespace, A Strategic Thought Paper;" TIBCO Software, Inc.; Jun. 19, 2007; 23 Pages.
Levchuk et al., "Analytic Model Driven Organizational Design and Experimentation in Adaptive Command and Control;" Systems Engineering, vol. 2, Issue 2; Aug. 23, 1999; 11 Pages.
Marques et al., "COA Modelling with Probabilistic Ontologies;" Proceedings of the 6$^{th}$ International Conference on Semantic Technologies for Intelligence, Defense and Security (STIDS); Nov. 16-17, 2011; 8 Pages.
Zhang et al., "Generating Executable Capability Models for Requirements Validation;" Journal of Software, vol. 7, No. 9; Sep. 2012; 7 Pages.
Response to Canadian Examination Report dated Dec. 1, 2015 corresponding to Canadian Application No. 2,867,577; Response filed on May 24, 2016; 12 Pages.
Response to Second European Examination Report dated Dec. 3, 2015 corresponding to European Application No. 12780938.2; Response filed on Apr. 13, 2016; 15 Pages.
Office Action dated Apr. 29, 2016 corresponding to U.S. Appl. No. 14/529,850; 30 Pages.
Response (with Reporting Email and Amended Claims in English) to Japanese Office Action dated Sep. 25, 2015 for Japanese Application No. 2015-501788; Response filed on Mar. 25, 2016; 13 Pages.
Final Office Action dated Mar. 25, 2016 corresponding to U.S. Appl. No. 14/109,059; 40 Pages.
Barthelemy et al., "Knowledge Representation Issues in Semantic Graphs for Relationship Detection;" UCRL-CONF-209835; 2005; 8 Pages.
Buchler et al., "The Warfighter Associate: Decision-Support and Metrics for Mission Command;" ARL-TR-6309; Army Research Laboratory; Jan. 2013; 56 Pages.
Dou et al., "Ontology-based Integration for Relational Databases;" Proceedings of the 2006 ACM Symposium on Applied Computing (SAC '06); 2006; pp. 461-466; 6 Pages.
Gambold, "Unmanned Aircraft System Access to National Airspace;" Background Paper; Published by The Honourable Company of Air Pilots found at <http://www.airpilots.org/aviation-matters/policy-and-comment/discussion-papers/>; Nov. 2011; 48 Pages.

(56) References Cited

OTHER PUBLICATIONS

Response to Office Action dated Sep. 14, 2015 corresponding to U.S. Appl. No. 14/109,059; Response filed on Dec. 7, 2015; 14 Pages.
Response to Singapore Written Opinion dated Nov. 4, 2014 corresponding to Singapore Application No. 11201401150V; Response filed on Apr. 6, 2015; 7 Pages.
Singapore Written Opinion dated May 20, 2015 corresponding to Singapore Application No. 11201401150V; 5 Pages.
European Examination Report dated Apr. 29, 2015 corresponding to European Application No. 12780938.2; 6 Pages.
Response to European Examination Report dated Apr. 29, 2015 corresponding to European Application No. 12780938.2; Response filed Sep. 8, 2015; 10 Pages.
Second European Examination Report dated Dec. 3, 2015 corresponding to European Application No. 12780938.2; 7 Pages.
Canadian Examination Report dated Jul. 30, 2015 corresponding to Canadian Application No. 2,850,478; 4 Pages.
Response to Canadian Examination Report dated Jul. 30, 2015 corresponding to Canadian Application No. 2,850,478; Response filed on Sep. 30, 2015; 13 Pages.
Response to Japanese Office Action dated May 11, 2015 corresponding to Japanese Application No. 2014-534595; Response filed on Aug. 14, 2015; 10 Pages.
Japanese Allowance Report dated Feb. 3, 2016 corresponding to Japanese Application No. 2014-534595; 7 Pages.
European Office Action dated May 2, 2016 corresponding to European Application No. 2,850,478; 4 Pages.
Canadian Examination Report dated Dec. 1, 2015 corresponding to Canadian Application No. 2,867,577; 3 Pages.
U.S. Final Office Action dated Feb. 10, 2017 for U.S. Appl. No. 14/109,059; 45 Pages.
Buchler et al., "The Warfighter Associate: Decision Support and Metrics for Mission Command;" ARL-TR-6309; Army Research Laboratory, Aberdeen Proving Ground, MD 21005-5425; Jan. 2013; 56 pages.
Gambold, "Unmanned Aircraft System Access to National Airspace;" Background Paper; www.airpilots.org; Nov. 2011; 48 pages.
Third European Examination Report dated Jun. 22, 2016 corresponding to European Application No. 12780938.2; 7 Pages.
Israeli Office Action dated Aug. 23, 2016 corresponding to Israeli Application No. 231774; 8 Pages.
Response to Israeli Office Action dated Aug. 23, 2016 corresponding to Israeli Application No. 231774; Response filed Sep. 11, 2016; 4 Pages.
Canadian Examination Report dated Sep. 20, 2016 corresponding to Canadian Application No. 2,867,577; 5 Pages.
U.S. Office Action dated Jul. 29, 2016 corresponding to U.S. Appl. No. 14/109,059; 33 Pages.
Response to U.S. Office Action dated Jul. 29, 2016 corresponding to U.S. Appl. No. 14/109,059; Response filed on Sep. 28, 2016; 14 Pages.
U.S. Notice of Allowance dated Sep. 16, 2016 corresponding to U.S. Appl. No. 14/529,850; 7 Pages.
European Examination Report dated Oct. 11, 2017 for European Application No. 13714112.3; 5 Pages.
Notification of Transmittal of the International Search Report and Written Opinion of the ISA dated Jul. 1, 2013; for International Appl. No. PCT/US2013/031714 1 page.
International Search Report dated Jul. 1, 2013; for International Appl. No. PCT/US2013/031714 4 pages.
Written Opinion of the ISA dated Jul. 1, 2013; for International Appl. No. PCT/US2013/031714 6 pages.
European Examination Report dated May 24, 2018 for European Application No. 13714112.3; 5 Pages.
Canadian Examination Report dated Jul. 31, 2018 for Canadian Application No. 2,867,577; 3 Pages.
Examiner's Report dated Jul. 31, 2017 for Canadian Application No. 2,867,577; 5 Pages.
Japanese Notice of Allowance dated Sep. 29, 2017 (with English claims) for Japanese Application No. 2016-096680; 12 Pages.
Japanese Office Action dated Apr. 28, 2017 for Japanese Application No. 2016-096680; 7 Pages.
Response to Examiner's Report dated Jul. 31, 2017 for Canadian Application No. 2,867,577; Response filed Jan. 10, 2018; 4 Pages.
Response to Japanese Office Action (with English claims) dated Apr. 28, 2017 for Japanese Application No. 2016-096680; Response filed Jul. 28, 2017; 15 Pages.
Response to EPO Communication dated Oct. 11, 2017 for European Application No. 13714112.3; Response filed Dec. 19, 2017; 7 Pages.
Singapore Supplementary Examination Report dated Jun. 15, 2016 for Singapore Application No. 11201401150V; 2 Pages.
U.S. Patent Board Decision on Appeal dated Jul. 25, 2016 for U.S. Appl. No. 13/269,100; 12 Pages.
Response to U.S. Office Action dated Apr. 29, 2016 for U.S. Appl. No. 14/529,850; Response filed on Jul. 27, 2016; 15 Pages.
Response (with Amended Claims) to European Office Action dated May 24, 2018 for European Application No. 13714112.3; Response Filed Oct. 3, 2018; 15 Pages.
India Examination Report (with English Translation) dated Jan. 7, 2019 for India Patent Application No. 2025/KOLNP/2014; 7 Pages.
Response (with Amended Claims) to Examiner's Report dated Jul. 31, 2018 for Canadian Application No. 2,867,577; Response filed on Sep. 12, 2018; 13 Pages.

\* cited by examiner

ROUTING A DATA PACKET IN A COMMUNICATION NETWORK

RELATED APPLICATIONS

This application claims priority to Provisional Application Ser. No. 61/613,131 filed on Mar. 20, 2012 and titled "A METHOD TO ACHIEVE OPTIMAL-ROUTES SELECTION AND LOAD-BALANCING IN WIRELESS COMMUNICATION NETWORKS," which is incorporated herds by reference in its entirety.

BACKGROUND

A communication network includes multiple routers. The routers are located at subnet boundaries that are located between a sender and a receiver. The routers transfer data packets originating from the sender to the intended receiver. Often a communication network has multiple possible paths between the sender and the receiver, but only one single path is chosen to send data between the sender and the receiver.

SUMMARY

In one aspect, a method includes receiving a data packet at a renting node that includes a processor. The method also includes determining at least one value for the data packet selecting a routing table from a plurality of routing tables stored at the routing node in response to the at least one value for the packet and forwarding the data packet in response to the routing table selected. Each routing table is associated with a respective one cost function.

In another aspect, a routing node includes electronic hardware circuitry configured to receive a data packet at a routing node, determine at least one value for the data packet; select a routing table from, a plurality of routing tables stored at the renting node in response to the at least one value for the packet and forward the data packet in response to the routing table selected. Each routing table is associated, with a respective one cost function.

In a further aspect, an article includes a non-transitory computer-read able medium that stores computer-executable instructions. The instructions causing a machine to receive a data packet at a routing node, determine at least one value for the data packet, select a routing table from a plurality of routing tables stored at the routing node in response to the at least one value for the packet and forward the data packet in response to the routing table selected. Each routing table is associated with a respective one cost function.

DETAILED DESCRIPTION

Described herein is an approach that enables a routing node to forward a data packet based on the date packet itself that, for example, has the added benefit of spreading the traffic load across the multiplicity of possible paths. In this invention, a routing node includes a plurality of routing tables with each routing table corresponding to a respective cost function (versus conventional touting where only one routing table is used). Based on a value in the data packet a routing table is selected that determines where the data packet is routed.

Figure 1:
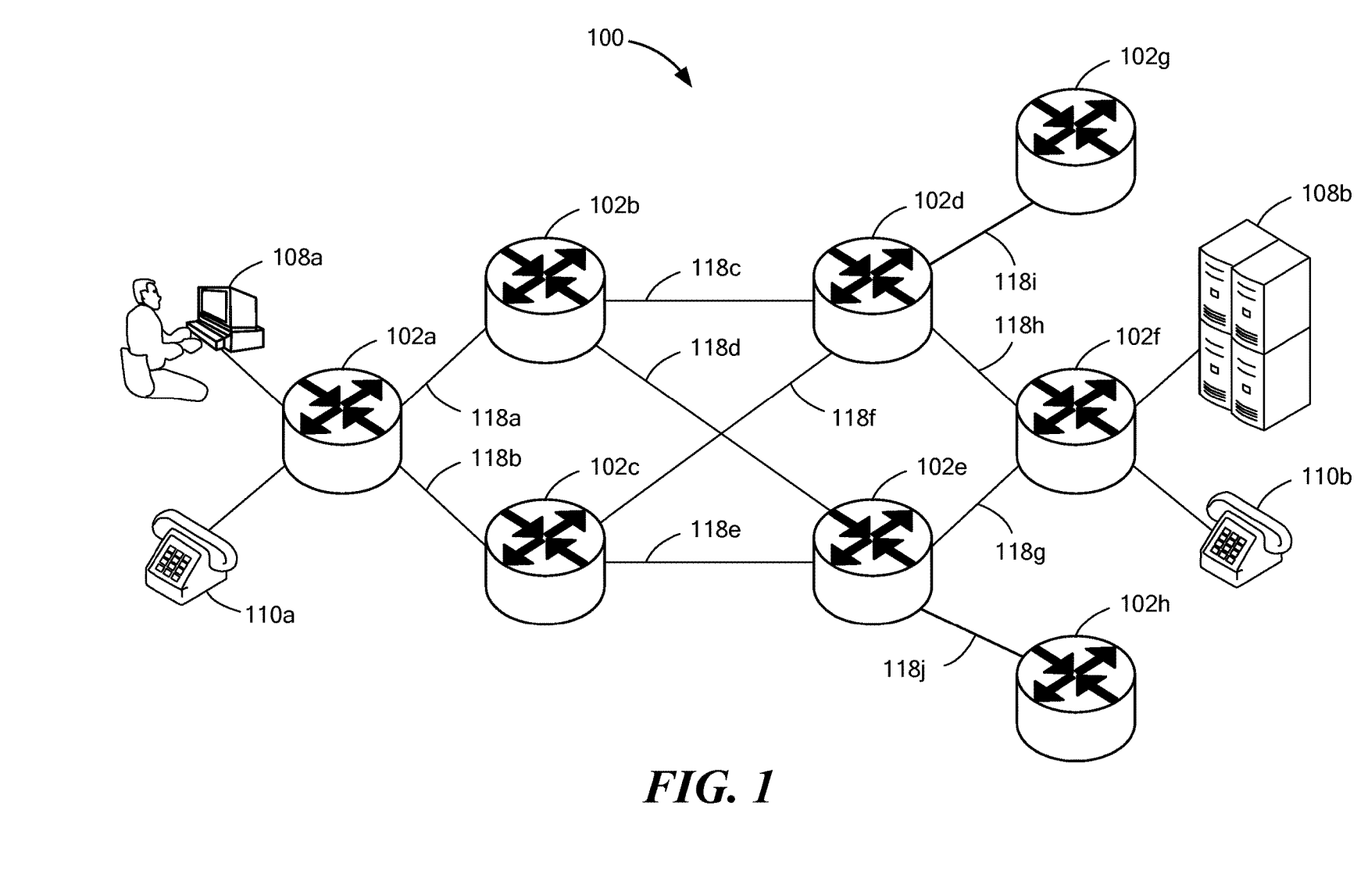
FIG. 1 is a block diagram of an example of a communication network.

Referring to FIG. 1, a communication network 100 includes nodes 102a-102h, file transfer protocol (FTP) transceivers 108a-108b and voice transceivers 110a-110b. The FTP transceiver 108a and the voice transceiver 110a are coupled to the node 102a. The node 102a is coupled to the node 102b by a link 118a, and is coupled to the node 102c by a link 118b. The node 102b is coupled to the node 102d by a link 118c and is coupled to the node 102e by a link 118d. The node 102c is coupled to the node 102d by a link 118f and is coupled to the node 102e by a link 118e. The node 102d is coupled to the node 102f by a link 118h and is coupled to the node 102g by a link 118i. The node 102e is coupled to the node 102f by a link 118g and is coupled to the node 102h by a link 118j. The node 102f is coupled to the FTP transceiver 108b and the voice transceiver 110b. Each of the links 118a-118j may be one of wired links, fiber optic links, wireless links or a combination of the three (or any other media that can carry IP traffic).

As can be observed in FIG. 1, there are a number of paths between the nodes 102a and 102f that data packets can travel. In prior approaches there would be a single "best" path chosen regardless of whether the packets were voice data or FTP data. However, as described herein, a route is chosen for each data packet based on the characteristics (delivery needs) of the data packet.

Figure 2:
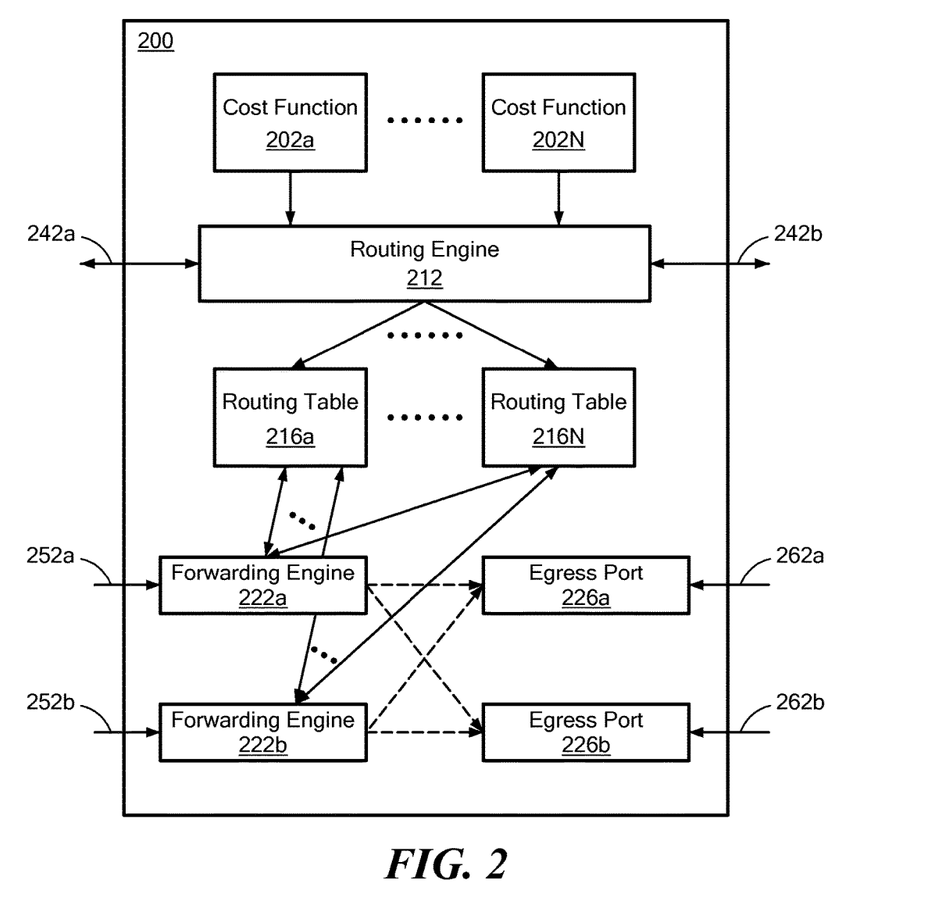
FIG. 2 is a block diagram of a routing node.

Referring to FIG. 2, in one example of how it may be implemented, a routing node 200 includes cost functions 202a-202N, a routing engine 212, rooting tables 216a-216N, forwarding engines 202a-202b and egress ports 226a-226b. Each routing table 216a-216N corresponds to a respective one of the cost function 202a-202N (e.g., the rooting table 216a corresponds to the cost function 202a; the routing table 216N corresponds to the cost function 202N). In one example, the routing engine 212 generates a routing table 216a-216N for each cost function 202a-202N.

For example, once all the cost, functions are defined, the router builds the routing tables 216a-216N. For every given cost function 202a-202N, each one corresponding to one (each) of the data characteristics to be accommodated on the network, the Routing Engine 212 calculates the cost metric for each candidate route. Then, the Routing Engine 212 builds a routing table by selecting the best, paths (Interfaces) for the data packet's destination. This process repeats until all routing tables are built. To perform the packet forwarding, the routing node 200 first selects the routing table by using the value determined for the packet by methods that include one of various packet classification schemes available (e.g., Differentiated Services (DiffServ) Code Point (DSCP), port number or ID, source-destination pair, and so forth). Then, the routing node 200 selects a forwarding path (interface or egress port) based on the routing table and on the destination address. If multiple paths exist for the targeted address, the routing node 200 supports equal-cost or unequal-cost load balancing. The routing node 200 distributes traffic evenly or proportionally with respect to the cost metric among those routes, making them equal in cases where the metrics are of equivalent value.

The routing engine 212 receives topology and link state updates through the connections 242a, 242b and updates the routing tables 216a-216N based on current network conditions (e.g., loading, capacity, delay/latency and so forth).

In other examples, the cost functions 202a-202N can (optionally) be stored in a central location for ease of network management and provided to the node 200 for local storage and use. A cost function is thus provided by a user to establish importance of certain parameters. In another example, a cost function may be based at least one of bandwidth, load, delay, reliability and so forth parameters and the user may weight these parameters in a cost function. However, different types of data packets may not function efficiently in a communication network using only one particular cost function. For example, one can construct a generic cost function for mobile ad-hoc networks (MANET), such as:

$$F_{MANET} = \left[\frac{K1 \times (1 - \text{utilization}) \times \text{bandwidth}}{100000000} + \frac{K2}{\text{latency}}\right] \times \frac{K3}{BER + K4}.$$

Then, a user will select a suite of K (henceforth described as a "vector") that applies differently depending on traffic class of the packet being routed. For example, consider two traffic streams, i.e., FTP and voice.

For FTP traffic, the user sets FTP's K-vector to (2,0,1,1) to weight bandwidth and load. Thus, $$F_{FTP} == \left[\frac{2 \times (1 - \text{utilization}) \times \text{bandwidth}}{100000000}\right] \times \frac{1}{BER + 1}.$$

For voice traffic, the K-vector can be set to (0,1,1,1) to weight its delay sensitiveness. Thus, $$F_{Voice} == \frac{1}{\text{latency}} \times \frac{1}{BER + 1}.$$

The K values of one traffic type would compromise the performance of the other traffic type because these different traffic types warrant different K-vector. As will be shown further herein, different types of data packets may function more efficiently in a network using a different cost function.

The links 252a, 252b provide data packets to a respective one of the forwarding engine 222a, 222b. The forwarding engines 222a, 222b, based on one or more values in a data packet determines the appropriate routing table to use (i.e., the appropriate cost function to use) and provides the data packet to the appropriate egress port 226a, 226b. The egress ports 226a, 226b provide data packets to a respective link 262a, 262b.

Figure 3:
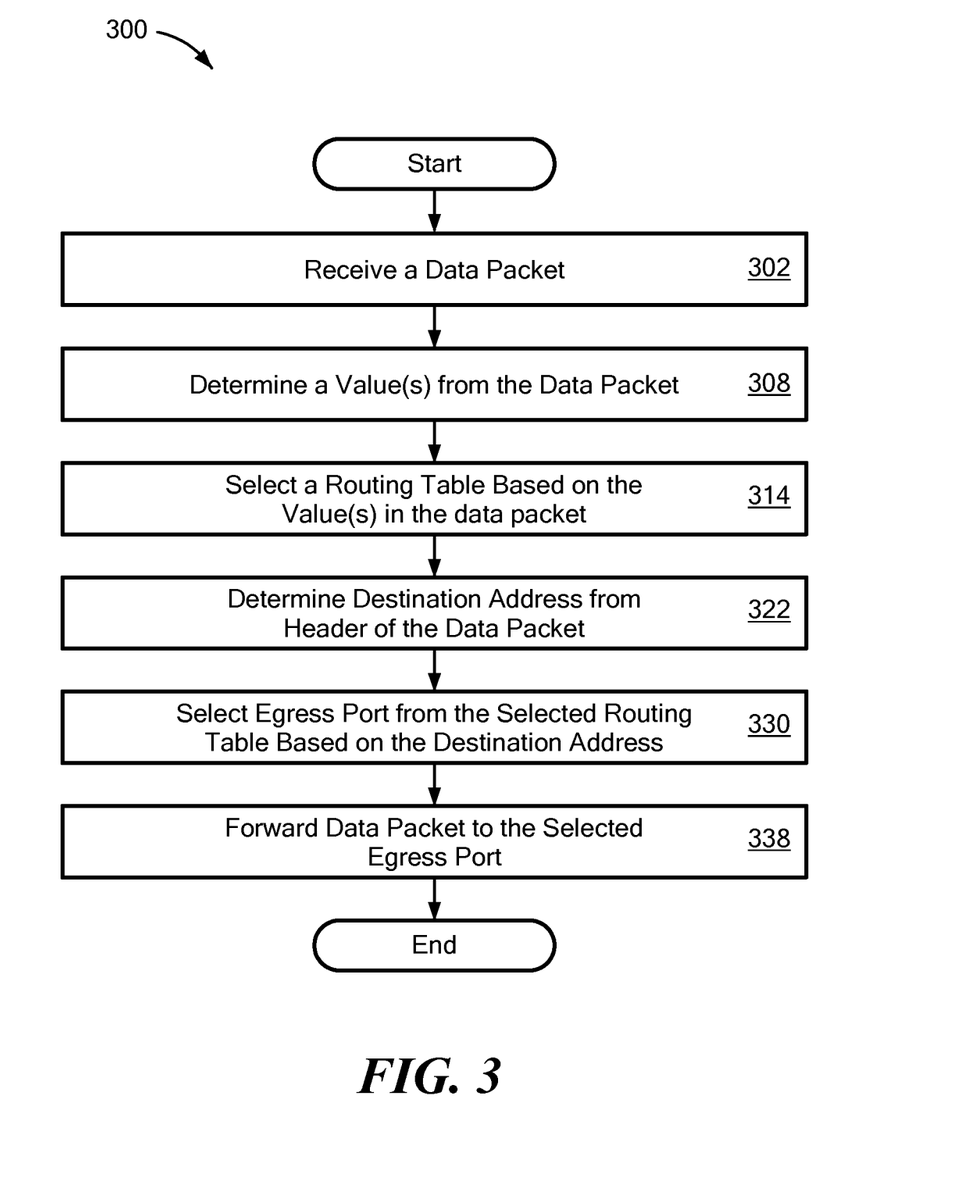
FIG. 3 is a flowchart of an example of a process to forward a data packet.

Referring to FIG. 3, an example of a process to route data packets is a process 300. Process 300 receives a data packet (302). For example, the router 200 receives a packet from one of the links 252a, 252b.

Process 300 determines a value(s) from the data packet (308). For example, the forwarding engine 222a determines a value(s) from the data packet. In one example, the value corresponds to a traffic class in the header of the data packet. In one particular example, the value is a Differentiated Services (DiffServ) code point (DSCP) value. DiffServ uses a 6-bit Differentiated Services Field (DS field) in the IP header for packet classification purposes which generates up to 64 ($2^6$) values. Thus, there may be up to 64 routing tables using a 6-bit Differentiated Services Field as the value. Other values any include, but are not limited to, a port number or ID, source-destination pair, and so forth.

Process 300 selects a routing table based on the value(s) from the data packet (314). For example, the forwarding engine 222a selects a routing table based on the DSCP value in the data packet. Each routing table corresponds to one cost function and each entry in the table describes the best route for a given destination address (for that particular traffic type). In some examples, there may exist multiple best routes in the table for a given destination if there are equally good.

Process 300 determines a destination address from a header of the data packet (322). For example, the forwarding engine 222a determines a destination address by using the destination address in the IP header of the data packet.

Process 300 selects the egress port from the selected routing table based on the destination address (330). For example, the forwarding engine 222a selects one of the egress ports 226a, 226b by looking up the destination address in the selected routing table.

Process 300 forwards the data packet to the selected egress port (338). For example, the forwarding engine 222a forwards die data packet the selected egress ports.

Figure 4:
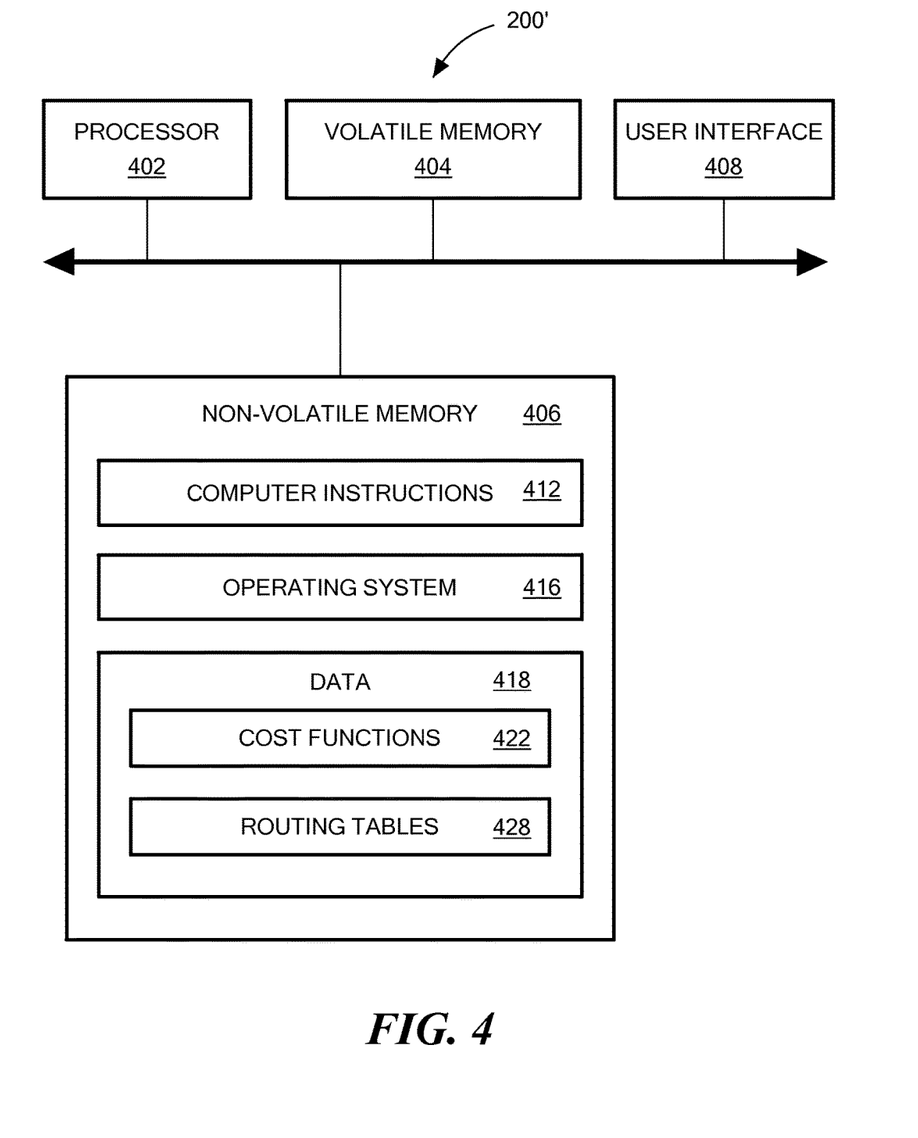
FIG. 4 is a block diagram of a computer on the process of FIG. 3 may be implemented.

Referring to FIG. 4, in one example, a routing node 200 includes a processor 402, a volatile memory 404, a non-volatile memory 406 (e.g., hard disk) and the user interface (UI) 408 (e.g., a graphical user interface, a mouse, a keyboard, a display, touch screen and so forth). The non-volatile memory 406 stores computer instructions 412, an operating system 416 and data 418 such as cost functions 422 and routing tables 428. In one example, the computer instructions 412 are executed by the processor 402 out of volatile memory 404 to perform all or part, of the processes described herein (e.g., process 300).

The processes described herein (e.g., process 300) are not limited to use with the hardware and software of FIG. 4; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 300 is not limited to the specific processing order of FIG. 3. Rather, any of the processing blocks of FIG. 3 may be re-ordered, combined or removed, performed in parallel or in serial, as necessary, to achieve the results set forth above.

In some examples, multiple routing tables may be combined in to a single routing table. In these examples, value-to-route associations are incorporated (directly or indirectly) into the combined routing table thereby enabling the appropriate route selection to be made.

The processing blocks (for example, in the process 300) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, programmable logic devices or logic gates.

Elements of different embodiments described herein may be combined to form other embodiments not specifically set forth above. Other embodiments not specifically described herein are also within the scope of the following claims.

What is claimed is:

1. A method comprising:
   receiving a data packet at a routing node comprising a processor;
   determining at least one Differentiated Services (DiffServ) code point (DSCP) value in a header of the data packet;
   selecting a routing table from a plurality of routing tables stored at the routing node in response to the at least one DSCP value for the packet, each routing table associated with a respective one cost function; and
   forwarding the data packet in response to the routing table selected,
   wherein each cost function is a function of respective parameters, comprising a utilization, a bandwidth, a latency and a bit error rate (BER), and each of the respective parameters are weighted by corresponding values of a respective K-vector,
   wherein the values of the respective K-vector for the packet are selected in response to a traffic class of the packet.

2. The method of claim 1 wherein receiving a data packet at a routing node comprising a processor comprises receiving the data packet at the routing node from a first link, and wherein forwarding the data packet in response the value of the data packet comprises forwarding the data packet to a second link.

3. The method of claim 1, further comprising combining the plurality of routing tables into a combined table, the combined table incorporating value-to route associations, and
   wherein selecting a routing table from a plurality of routing tables comprises selecting the combined table.

4. The method of claim 1 wherein determining at least one value located in a header of the data packet comprises determining at least one of a port number value or ID, or a source-destination pair value.

5. The method of claim 1, further comprising setting the K-vector to (2,0,1,1) to weight bandwidth and load.

6. The method of claim 1, further comprising setting the K-vector to (0,1,1,1) to weight delay sensitivity.

7. A routing node, comprising:
   electronic hardware circuitry configured to:
   receive a data packet at the routing node;
   determine at least one Differentiated Services (DiffServ) code point (DSCP) value in a header of the data packet;
   select a routing table from a plurality of routing tables stored at the routing node in response to the at least one DSCP value for the packet, each routing table associated with a respective one cost function; and
   forward the data packet in response to the routing table selected,
   wherein each cost function is a function of respective parameters, comprising a utilization, a bandwidth, a latency and a bit error rate (BER), and each of the respective parameters are weighted by corresponding values of a respective K-vector,
   wherein the values of the respective K-vector for the packet are selected in response to a traffic class of the packet.

8. The routing node of claim 7 wherein the circuitry comprises at least one of a processor, a memory, a programmable logic device or a logic gate.

9. The routing node of claim 7 wherein the circuitry to receive a data packet at a routing node comprising a processor comprises circuitry to receive the data packet at the routing node from a first link, and
   wherein the circuitry to forward the data packet in response the value of the data packet comprises circuitry to forward the data packet to a second link.

10. The routing node of claim 7, further comprising circuitry to combine the plurality of routing tables into a combined table, the combined table incorporating value-to route associations, and
    wherein the circuitry to select a routing table from a plurality of routing tables comprises circuitry to select the combined table.

11. The routing node of claim 7 wherein the circuitry to determine at least one value located in a header of the data packet comprises circuitry to determine at least one of a port number value or ID, or a source-destination pair value.

12. The routing node of claim 7, wherein the K-vector is set to (2,0,1,1) to weight bandwidth and load.

13. The routing node of claim 7, wherein the K-vector is set to (0,1,1,1) to weight delay sensitivity.

14. An article comprising:
    a non-transitory computer-readable medium that stores computer-executable instructions, the instructions causing a machine to:
    receive a data packet at a routing node;

determine at least one Differentiated Services (DiffServ) code point (DSCP) value in a header of the data packet;

select a routing table from a plurality of routing tables stored at the routing node in response to the at least one DSCP value for the packet, each routing table associated with a respective one cost function; and forward the data packet in response to the routing table selected, wherein each cost function is a function of respective parameters, comprising a utilization, a bandwidth, a latency and a bit error rate (BER), and each of the respective parameters are weighted by corresponding values of a respective K-vector, wherein the values of the respective K-vector for the packet are selected in response to a traffic class of the packet.

15. The article of claim 14 wherein the instructions causing the machine to receive a data packet at a routing node comprising a processor comprises instructions causing the machine to receive the data packet at the routing node from a first link, and wherein the instructions causing the machine to forward the data packet in response the value of the data packet comprises instructions causing the machine to forward the data packet to a second link.

16. The article of claim 14, further comprising instructions causing the machine to combine the plurality of routing tables into a combined table, the combined table incorporating value-to route associations, and wherein the instructions causing the machine to select a routing table from a plurality of routing tables comprises instructions causing the machine to select the combined table.

17. The article of claim 14 wherein the instructions causing the machine to determine at least one value located in a header of the data packet comprises instructions causing the machine to determine at least one of a port number value or ID, or a source-destination pair value.

18. The article of claim 14, wherein each routing table associated with a respective one cost function comprises each routing table associated with a respective one cost function from a plurality of cost functions stored at the routing node.

19. The article of claim 14, wherein the K-vector is set to (2,0,1,1) to weight bandwidth and load.

20. The article of claim 14, wherein the K-vector is set to (0,1,1,1) to weight delay sensitivity.

* * * * *